United States Patent [19]

Nelb, II et al.

[11] 4,410,684
[45] Oct. 18, 1983

[54] AROMATIC COPOLYAMIDES CONTAINING ETHER LINKAGES

[75] Inventors: Robert G. Nelb, II; Kemal Onder, both of North Haven, Conn.

[73] Assignee: The Upjohn Company, Kalamazoo, Mich.

[21] Appl. No.: 464,316

[22] Filed: Feb. 7, 1983

[51] Int. Cl.³ .................. C08G 69/32; C08G 69/40
[52] U.S. Cl. .................................................. 528/185
[58] Field of Search ............................. 528/176, 185

[56] References Cited
U.S. PATENT DOCUMENTS 3,505,288  4/1970  Bodesheim et al. ............... 260/47
4,072,665  2/1978  Onder ............................. 260/78 R
4,087,481  5/1978  Onder ......................... 260/857 TW
4,278,786  7/1981  Nanaumi et al. ................. 528/179

FOREIGN PATENT DOCUMENTS 56-99228  8/1981  Japan .

Primary Examiner—Lester L. Lee
Attorney, Agent, or Firm—James S. Rose; Denis A. Firth

[57] ABSTRACT

Novel copolyamides having the recurring unit

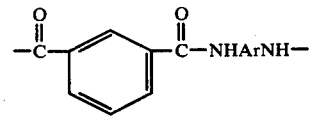

are disclosed wherein Ar in the major proportion of the recurring units is m-phenylene and in the corresponding minor proportion (but more than 10 percent) of the recurring units Ar is a phenylene ether having the formula

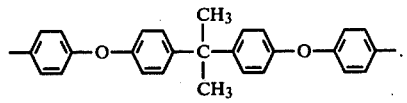

The copolyamides have excellent high temperature resistance but, unlike those polymers in which Ar in the above recurring unit is exclusively m-phenylene, they can be injection molded.

3 Claims, No Drawings

AROMATIC COPOLYAMIDES CONTAINING ETHER LINKAGES

BACKGROUND OF THE INVENTION

1. Field of the Invention

This invention relates to the preparation of copolyamides and is particularly concerned with aromatic copolyamides.

2. Description of the Prior Art

Various types of polyamide polymers, and, particularly, aromatic polyamides are well known in the art and are widely employed in a variety of applications. Of particular interest are the aromatic polyamides and copolyamides having high resistance to heat. Unfortunately, many of the wholly aromatic polyamides which do have excellent high temperature resistance are so high melting (>300° C.) as to be unmeltable without decomposition thereby precluding their manipulation by melt processing techniques such as injection molding. Consequently, while the properties of such polymers make them excellent candidates for a number of high temperature applications, their intractability narrows this use considerably.

A number of prior art polymers have been discovered which have solved the melt temperature intractability problem but with a resultant lowering in their high temperature resistance properties. For example, U.S. Pat. Nos. 4,072,665 and 4,087,481 disclose injection moldable copolyamides having good high temperature resistance wherein the combination of certain aliphatic and aromatic diradicals is taken advantage of to achieve these ends.

U.S. Pat. No. 3,505,288 discloses injection moldable aromatic polyamides wherein the —CONH— carbonamide groups (hereinafter —AB— wherein the —A and B— portions represent the —CO and the NH— respectively) are linked as —AABBAA— wherein the —BB— linkages contain particular phenylene ether diradicals and the —AA— linkages contain arylene diradicals.

U.S. Pat. No. 4,278,786 improves the melt moldability of the types of polyamides disclosed in U.S. Pat. No. 3,505,288 by employing a particular combination of m-phenylene and p-phenylene diradicals in the —AA— linkages. At the same time, this reference discloses that up to 50 mole percent of the phenylene ether diradicals in the —BB— linkages can be replaced by other types of arylene diradicals including m-phenylene before melt moldability deteriorates.

Closely related to U.S. Pat. No. 4,278,786 above is Japanese Kokai J56 099228 which discloses similar aromatic polyetheramides wherein 50 to 98 mole percent of the —BB— linkages contain the phenylene ether diradicals while 2 to 50 percent are based on arylene and/or alkylene diradicals and the —AA— linkages contain arylene diradicals.

We have now discovered an aromatic copolyamide wherein the randomly linked —AABBAA— polymer backbone has a majority of the recurring units wherein the —BB— linkages contain the m-phenylene diradical with only a minor proportion containing a particular phenylene ether diradical. All of the —AA— linkages contain the m-phenylene diradical.

Surprisingly, even though the all-aromatic polymer backbone is very similar to prior art non-injection moldable aromatic copolyamides, the polymers in accordance with the present invention are injection moldable.

Unexpectedly, the present polymers enjoy a considerably higher heat resistance than the prior art melt moldable copolyamides of the type set forth in U.S. Pat. No. 4,278,786, and Japanese Kokai No. J56 099228, cited supra.

SUMMARY OF THE INVENTION

This invention comprises a copolyamide having the recurring unit

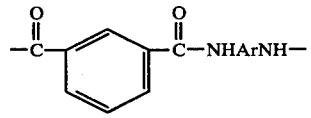

wherein Ar in the major proportion of the recurring units is m-phenylene and in the corresponding minor proportion of the recurring units Ar is a phenylene ether having the formula

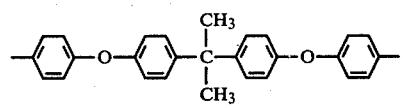

provided that the proportion of the recurring units in which Ar is the residue of the phenylene ether is greater than 10 percent.

The copolyamides prepared in accordance with the present invention can be used as molding powders, for the preparation of fibers and coatings from solution, for extruding profiles, for injection molding, and the like. The solid articles so obtained can be used in bushings, seal faces, electric insulators, compressor vanes and impellers, pistons and piston rings, gears, thread guides, cams, brake lining, clutch faces, abrasive articles. Further, coatings of the copolyamides of the present invention are useful in wire coating, in casting films, or spraying polymer films on a variety of substrates such as metal, ceramic, fabrics, polymerics, and the like.

DETAILED DESCRIPTION OF THE INVENTION

The novel copolyamides of the present invention have the recurring unit (I) set forth hereinabove wherein the major proportion of the recurring units have a —BB— linkage wherein the Ar diradical contained therein is m-phenylene and in the corresponding minor proportion of the recurring units the Ar diradical of the —BB— linkage is the phenylene ether having the formula (II) above. That is to say, the m-phenylene diradical is always present in greater than 50 percent of the recurring units.

Advantageously, in about 65 to about 85 percent of said recurring units Ar is m-phenylene and in the remaining 35 to 15 percent Ar is (II).

The presence of other types of aromatic diradicals in the —AA— or —BB— linkages (as for example p-phenylene, 2,4-, and 2,6-tolylene, and the like) in small amounts (e.g. less than 20 percent of the recurring units) is not excluded from the copolyamides in accordance with the present invention provided the presence of such other diradicals does not detract from the good polymer properties and provided the relative proportions of said m-phenylene and phenylene ether diradicals are essentially as defined above.

The novel copolyamides having the recurring unit (I) are easily prepared by methods well known to those skilled in the polymer art. For example, one procedure is the melt condensation process as typically set forth in U.S. Pat. No. 3,408,334, whose disclosure is hereby incorporated by reference. Isophthalic acid is reacted with a mixture of aromatic diamines (III) (i.e. m-phenylene diamine and 4,4'-di(p-aminophenoxy)diphenylpropane-2,2) wherein the m-phenylene diamine is always used in the major proportion and preferably within the molar proportions of about 65 to about 85 mole percent in accordance with the following equation.

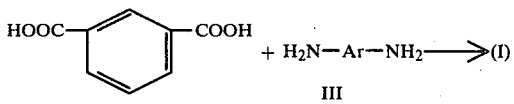

Another convenient process is the solution technique of U.S. Pat. No. 3,640,970 whose disclosure is hereby incorporated by reference, wherein an isophthaloyl dihalide (dichloride, dibromide, etc.) is reacted with the same amine mixture (III) in solution to form first a precondensate which upon treatment with an aqueous solution of an acid acceptor is converted to (I). And yet another process is that set forth in U.S. Pat. No. 3,642,715 whose disclosure is hereby incorporated by reference, wherein the diisocyanate mixture corresponding to mixture (III), that is to say m-phenylenediisocyanate and 4,4'-di(p-isocyanatophenoxy)-diphenylpropane-2,2 is reacted in solution with isophthalic acid to form the copolyamides (I) of the present invention.

The melt condensation technique is the least preferred because of the tendency for side reactions to occur at the elevated temperatures encountered in melt polymerization. Yields from either the acid halide route or, the diisocyanate route are normally as high as 99 percent.

Generally speaking, the use of a polymerization catalyst is advantageous when the isophthalic-diisocyanate route is followed and a preferred group of catalysts are the alkali metal alkoxides, alkali metal lactamates, and the cyclic phosphorus compounds set forth in U.S. Pat. Nos. 4,061,622; 4,094,866, and 4,156,065 respectively, whose disclosures in respect of the catalysis of the isocyanate-carboxylic acid reaction are incorporated herein by reference. Typical of such catalysts are sodium methoxide, sodium ethoxide, sodium phenoxide, and the like; potassium propiolactamate, potassium pyrrolidone, sodium caprolactamate, and the like; 1,3-dimethyl-3-phospholene-1-oxide, 1,3-dimethyl-2-phospholene-1-oxide, 3-methyl-1-phenylphospholane-1-oxide, and the like.

A preferred method for the preparation of the copolyamides (I) is the solution polycondensation technique in accordance with the general method of Kwolek et al U.S. Pat. 3,063,966 the disclosure of which in regard to the preparation of copolyamides is hereby incorporated by reference. In this method, the diamine mixtures (III) in the molar proportions discussed above are reacted with an essentially equivalent amount of the isophthaloyl halide in solution in the presence of an acid acceptor such as calcium hydroxide, triethylamine, and the like.

Typical solvents in which to carry out the condensation are methylene chloride, chloroform, N,N-dimethylformamide, N,N-diethylformamide, N,N-dimethylacetamide, N,N-diethylacetamide, N-methylpyrrolidone, tetramethylenesulfone, dimethylsulfoxide, tetramethylurea, diethylcyanamide, hexamethylphosphoramide, and the like.

In a preferred embodiment of the Kwolek et al method the above reactants are brought together, preferably under temperature controlled conditions (i.e. cooling conditions) in a weakly basic organic liquid which serves both as the polycondensation solvent and the acid acceptor. Typical of such dual purpose solvents are tetramethylurea, diethylcyanamide, dimethylacetamide, and hexamethylphosphoramide.

The resulting copolyamides are isolated using standard isolation techniques known to those skilled in the art. For example, the reaction solution can be treated with a non-solvent for the polymer causing it to precipitate and thereafter collecting the product by filtration. Typical non-solvents include water, methanol, ethanol, isopropanol, dioxane, cyclohexane, benzene, toluene, and the like.

Preferably, the copolyamides are isolated by pouring the polymer solution into an excess of rapidly stirring water containing a sufficient amount of a dissolved basic material (i.e., sodium carbonate, triethylamine, sodium hydroxide, etc.) to neutralize the hydrohalide adduct with the solvent. The polymer precipitates and is collected by filtration, etc.

The copolyamides in accordance with the present invention are characterized as random amorphous polymers having high modulus properties.

The copolyamides are further characterized by having inherent viscosities of at least 0.5 when determined under typical conditions of 0.5 percent concentration in N-methylpyrrolidone at 30° C.

Also, in spite of the total aromatic content, the copolyamides have good solubility in those solvents normally employed for polyamides. Illustrative of such solvents are the phenolic solvents such as meta-cresol, cresylic acid, and the like, and dipolar aprotic solvents such as the typical ones disclosed above which serve as preferred reaction solvents for the preparation of the polymers. Because of their good solubility, this allows the present copolyamides to be used in those applications calling for solutions such as in the preparation of films, coatings, lamination, and the like.

The remarkable feature of the present copolyamides is their combination of excellent resistance to high temperatures with their injection moldability. The former property is almost equal to that of prior art polyamides wherein the —AA— and —BB— linkages both contain the m-phenylene diradical in all of the recurring units as in poly(m-phenyleneisophthalamide), as evidenced by the comparison of the observed Tg value of 278° C. for a sample of the latter polymer with the value of 266° C. for one of the present copolyamides said comparison being set forth in Example 1 below. This finding is completely contrary to the teaching of U.S. Pat. No. 4,278,786 cited supra (see particularly column 6 line 27 et seq.) which indicates the lack of melt-moldability of copolyamides wherein the —BB— linkages in greater than 50 percent of the recurring units contain a m-phenylene diradical.

Additives such as antioxidants, dyes, fire retardants, and the like may be added to solutions of the polymers of the present invention in solvents of the type set forth above. Alternatively, the additives may be added to the dry powder polymers either prior to, or during, processing steps such as molding, extruding, injection molding and the like.

The following examples describe the manner and process of making and using the invention and set forth the best mode contemplated by the inventors of carrying out the invention but are not to be construed as limiting.

EXAMPLE 1

A 500 ml. resin flask equipped with a mechanical stirrer, addition funnel, thermometer, a nitrogen inlet tube, and a reflux condenser was thoroughly dried by heating with an electric heat gun while under a constant flow of dry nitrogen gas. The flask was charged with 10.90 g. (0.2014 eq.) of m-phenylenediamine and 10.23 g. (0.0499 eq.) of 4,4'-di(p-aminophenoxy)diphenylpropane-2,2 and this mixture dissolved in 350 ml. of dimethylacetamide.

The solution as stirred and cooled to $-20°$ C. by a dry-ice acetone bath.

The addition funnel was charged with a solution prepared from 25.50 g. (0.2513 eq.) of isophthaloyl chloride dissolved in 25 ml. of toluene. This solution was added slowly in one continuous addition followed by the addition of 25 ml. of toluene rinse of the addition funnel. A reaction temperature of $-20°$ C. was maintained for 15 minutes after the addition was complete. At the end of this period an ice-water bath was placed under the flask and, during stirring, the solution was allowed to rise to ambient room temperature (circa 20° C.). Stirring was continued overnight.

The polymer solution was slowly poured into about 1 liter of water in a rapidly stirred Waring blender. Sodium carbonate was added to the mixture to neutralize the hydrochloric acid. The polymer which precipitated was ground into a comminuted fibrous form by the action of the blender. The polymer was collected by suction filtration and washed several times with water and allowed to soak overnight in fresh water. This process was repeated by allowing the product to soak a second night under fresh water. Finally, the polymer powder was collected by suction filtration, air-dried at about 75° C. followed by drying under vacuum (1 mm. pressure of mercury) at 90° C. overnight.

Thus there was obtained a copolyamide in accordance with the present invention having the recurring unit

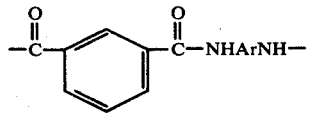

in which 80 percent of the recurring units Ar represented m-phenylene and in the remaining 20 percent of the recurring units Ar represented

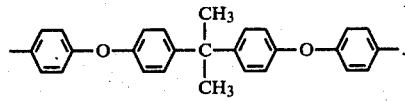

The copolyamide was characterized by an inherent viscosity, ηinh in N-methylpyrrolidone (0.5% at 30° C.)=1.22 dl/g; and a Tg=266° C. as determined by differential scanning calorimetry (DSC) obtained from a sample of the polymer powder using a DuPont 990 Thermal Analyzer instrument and determined under nitrogen at a heating rate of 20° C./minute.

A 2" ×0.1" molded disk of the polymer was prepared by compression molding 8 g. of the polymer powder at a mold temperature of 310° C. and under 5000-6000 psi.

A disk of the polymer was cut into pellets and about 5 g. of the pelletized polymer was loaded into the barrel of a Monsanto Capillary Rheometer Model 3501 which had been preheated to 315° C. After a 5 to 10 minute equilibration period the polymer was ram extruded through a 4:1 die at a pressure of 2100 psi. The polymer was relatively fluid and found to be easily injection moldable.

From another disk of the polymer prepared as described above a 2"×5/16" bar was cut and a plot of shear modulus vs. temperature of the sample determined by subjecting it to the Gehman test procedure in accordance with ASTM D 1053-58T on a modified Gehman Torsion Stiffness Tester fitted with a heavy duty furnace to allow measurements up to 500° C. The plot displayed a modulus decrease from above $10^{10}$ dynes/cm$^2$ to almost $10^6$ dynes/cm$^2$ when heated from 100° C. to 300° C. with no evidence for any increase of up-turn in the modulus curve. A decrease below $10^7$ dynes/cm$^2$ without any upturn in the curve is characteristic of an injection moldable polymer.

The shear modulus behavior of the sample along with the ease of its extrusion through a capillary rheometer clearly showed its injection moldability.

For comparison purposes, the two following polyamides not in accordance with the present invention were prepared.

In one preparation, using the same apparatus, reactants, and procedure described above except that 12.09 g. (0.2235 eq.) of m-phenylenediamine was reacted with 22.68 g. (0.2235 eq.) of isophthaloyl chloride in 300 ml. dimethylacetamide with 20 ml. of toluene for the acid chloride and 10 ml. toluene rinse, there was prepared poly(m-phenyleneisophthalamide) having the recurring unit

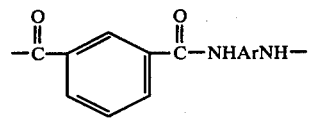

wherein Ar in 100 percent of the recurring units represented

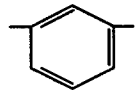

In the other preparation, using the same apparatus, reactants, and procedure described above except that 14.73 g. (0.2723 eq.) of m-phenylenediamine and 6.23 g. (0.0304 eq.) of 4,4'-di(p-aminophenoxy)diphenylpropane-2,2 were reacted with 30.72 g. (0.3027 eq.) of isophthaloyl chloride there was prepared the polymer having the recurring unit

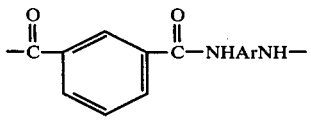

wherein Ar in 90 percent of the recurring units was m-phenylene while in the remaining 10 percent of the recurring units Ar was

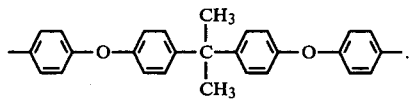

In the case of the 100 percent m-phenylene polyamide, its ηinh in n-methylpyrrolidone at 0.5% and 30° C. = 1.23 dl/g; and Tg by DSC = 278° C. The polymer could not be extruded through the Monsanto capillary rheometer at 315° C. and a pressure of 6750 psi. In fact, the die was removed and a hammer had to be used to remove the plug of solid polymer. Also, when a sample bar of the compression molded polymer was subjected to a temperature of from 100° C. to 300° C. in the Gehman test the modulus decreased from almost $10^{11}$ dynes/cm$^2$ to just below $10^8$ dynes/cm$^2$ and then the curve immediately turned upwards above 300° C. There was no sign of the curve coming anywhere near the $10^7$ dynes/cm$^2$ mark let alone falling below it. Clearly, this polymer was not injection moldable.

In the case of the 90/10 polyamide, its ηinh in N-methylpyrrolidone at 0.5% and 30° C. = 1.30 dl/g; and Tg by DSC = 271° C. When the polymer was tested in the Monsanto capillary rheometer at 315° C. and a pressure of 6750 psi only a part of the sample extruded at 0.13 g/minute and that part exhibited a great deal of melt fracture. When a sample bar of the compression molded polymer was subjected to a temperature of from 100° C. to 270° C. it dropped from a modulus of just above $10^{10}$ dynes/cm$^2$ to below $10^7$ dynes/cm$^2$ but immediately the modulus turned upwards above $10^7$ dynes/cm$^2$ over the range from 270° C. to 300° C.

In contrast to the 80/20 copolyamide in accordance with the present invention which is injection moldable, the 100/0 and 90/10 comparison polymers are not injection moldable.

EXAMPLE 2

Using the same apparatus and procedure described above in Example 1, 12.72 g. (0.2352 eq.) of m-phenylenediamine and 20.64 g. (0.1007 eq.) of 4,4'-di(p-aminophenoxy)diphenylpropane-2,2 were reacted with 34.10 g. (0.3359 eq.) of isophthaloyl chloride in 25 ml. toluene. The polymer product was isolated using the same procedure described in Example 1.

Thus there was obtained a copolyamide in accordance with the present invention having the recurring unit

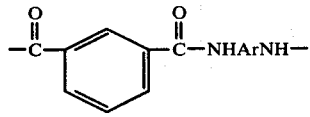

in which 70 percent of the recurring units Ar represented m-phenylene and in the remaining 30 percent of the recurring units Ar represented

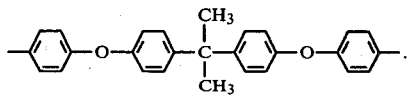

The copolyamide was characterized by an inherent viscosity, ηinh in N-methylpyrrolidone (0.5% at 30° C.) = 1.66 dl/g; and Tg by DSC = 260° C.

A 2"×0.1" molded disk of the polymer was prepared by compression molding 8 g. of the polymer powder at a mold temperature of 290° C. and 5000-6000 psi.

A 5 g. sample of the pelletized polymer was extruded through the Monsanto capillary rheometer at 315° C. and 2100 psi at an extrusion rate of 8.8 g./minute, some melt fracture was noted but the material easily extruded. When a test bar of the polymer was subjected to the Gehman torsional test over a temperature range from 100° C. to 300° C. it dropped from about $10^{10}$ dynes/cm$^2$ to well below $10^7$ dynes/cm$^2$ with no indication of modulus increase even above 300° C.

For comparison purposes, the following copolyamide not in accordance with the present invention was prepared.

Using the same apparatus and procedure described above except that 5.40 g (0.0999 eq.) of m-phenylenediamine and 20.39 g. (0.0995 eq.) of 4,4'-di(p-aminophenoxy)diphenylpropane-2,2 were reacted with 20.23 g. (0.1993 eq.) of isophthaloyl chloride with 20 ml. of toluene for the acid chloride and 2×10 ml. toluene rinses, there was prepared the polymer having the recurring unit

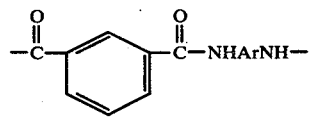

wherein Ar in 50 percent of the recurring units represented

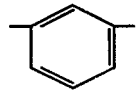

and in the remaining 50 percent of the recurring units Ar represented

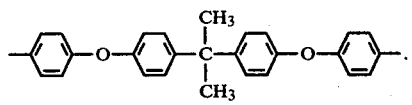

The copolyamide was characterized by an inherent viscosity, ηinh in N-methylpyrrolidone (0.5% at 50° C.) = 1.61 dl/g; and Tg by DSC = 250° C.

A 2"×0.1" molded disk of the polymer prepared by compression molding 8 g. of the polymer powder at a mold temperature of 290° C. and 5000-6000 psi.

A 5 g. sample of the pelletized polymer was extruded through the Monsanto capillary rheometer at 315° C. and 2100 psi at an extrusion rate of 67.8 g./minute. When a test bar of the polymer was subjected to the Gehman torsional test over a temperature range from 100° C. to 280° C. it dropped from above $10^{10}$ dynes/cm$^2$ to well below $10^7$ dynes/cm$^2$ with no indication of a modulus increase.

While the 50/50 copolyamide not in accordance with the present invention is easily injection moldable along with the 70/30 copolyamide of the present invention, the heat resistance, or, end-use temperature resistance of the 50/50 material is markedly lower than that of the 70/30 material as evidenced by the difference in their Tg values.

We claim:

1. A copolyamide having the recurring unit

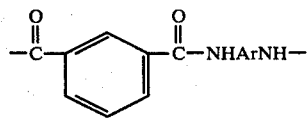

wherein Ar in about 65 to about 85 percent of the recurring units is m-phenylene and in the remainder of the recurring units Ar is a phenylene ether having the formula

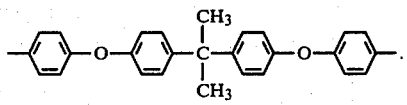

2. A copolyamide according to claim 1 wherein Ar in about 70 percent of said recurring units is m-phenylene and the remainder of said units are those in which Ar is said phenylene ether.

3. A copolyamide according to claim 1 wherein Ar in about 80 percent of said recurring units is m-phenylene and the remainder of said units are those in which Ar is said phenylene ether.

* * * * *